United States Patent
Kovacevic

(10) Patent No.: US 6,807,585 B2
(45) Date of Patent: Oct. 19, 2004

(54) METHOD AND SYSTEM FOR PARSING SECTION DATA

(75) Inventor: Branko D. Kovacevic, Willowdale (CA)

(73) Assignee: ATI Technologies, Inc., Thornhill (CA)

(*) Notice: Subject to any disclaimer, the term of this patent is extended or adjusted under 35 U.S.C. 154(b) by 418 days.

(21) Appl. No.: 09/791,045

(22) Filed: Feb. 22, 2001

(65) Prior Publication Data
US 2002/0172198 A1 Nov. 21, 2002

(51) Int. Cl.[7] .............................................. G06F 3/00
(52) U.S. Cl. ........................ 710/5; 710/29; 710/31; 710/32; 710/33; 710/52; 710/105; 712/405
(58) Field of Search ........................... 710/5, 29, 31, 710/32, 33, 52, 105; 712/405

(56) References Cited

U.S. PATENT DOCUMENTS

| | | | | |
|---|---|---|---|---|
| 5,809,334 A | * | 9/1998 | Galdun et al. | 710/22 |
| 5,916,305 A | * | 6/1999 | Sikdar et al. | 709/236 |
| 5,917,821 A | * | 6/1999 | Gobuyan et al. | 370/392 |
| 6,072,771 A | * | 6/2000 | Anderson et al. | 370/216 |
| 6,266,727 B1 | * | 7/2001 | Smyers et al. | 710/105 |
| 6,377,998 B2 | * | 4/2002 | Noll et al. | 709/236 |
| 2002/0010793 A1 | * | 1/2002 | Noll et al. | 709/240 |

FOREIGN PATENT DOCUMENTS

WO    WO9526595 A   * 10/1995    .............. H04J/3/02

* cited by examiner

*Primary Examiner*—Jeffrey Gaffin
*Assistant Examiner*—Angel L. Casiano

(57) ABSTRACT

A system and methods are shown for accommodating high-speed data retention. Multimedia packetized stream data packets are received through a receiving hardware system. Program Specific Information and System Information data tables describing the programs and information in the packetized stream are sent as section packets within the packetized stream. Various fields are included with the section packets describing such information as the portion of the data table represented, the type of data table represented, and the version of the table represented. A host system configures the section parser to identify and pass only the section packets with the fields it specifies. The section parser then compares the fields to the configured values and determines whether to pass the packets to the host system or to discard the packets. Accordingly, processing overhead conventionally left to the host system is performed through the section parser.

29 Claims, 10 Drawing Sheets

METHOD AND SYSTEM FOR PARSING SECTION DATA

FIELD OF THE DISCLOSURE

The present invention relates generally to the parsing of packetized stream data, and specifically to the parsing of section data in MPEG-2 transport stream data. A section is a syntactic structure that is used for mapping each ITU-T Rec. H.222.0|ISO/IEC 13818-1 defined program specific information table into Transport Stream packets.

BACKGROUND

The international organization for standards (ISO) moving pictures experts group (MPEG group), approved an audio video digital compression standard, based on packetized stream data, known as MPEG-2 in an effort to provide a versatile compression standard capable of being utilized for a wide variety of data. The MPEG-2 standard provides explanations needed to implement an MPEG-2 decoder through the use of syntax and semantics of a coded bit stream. MPEG-2 is an open standard which continues to evolve and be applied to a variety of applications ranging from video conferencing to high definition television. As a generic standard, MPEG-2 is intended to be used for a variety of audio and video coding applications. Part one of the MPEG-2 standard (ISO 13818-1), was designated to improve error resilience and carry multiple programs simultaneously without a common time base between programs.

The packetized stream (PS) specified by the MPEG-2 standard, offers a high degree of robustness for noisy channels, and can be used to carry multiple programs, such as multiple TV services. The packetized stream is based on a 188 byte long packet suited for hardware error correction and processing schemes. The use of a robust protocol, such as the packetized stream, allows for reception over noisy environments such as terrestrial and satellite transmissions. Even in these environments it is possible to obtain fast program access, channel hoping, and synchronization between multiple elementary streams carried within the packetized elementary streams which are subdivided into transport packets.

Prior art FIG. 1 illustrates a Transport Packet Stream defined by the MPEG-2 standard. The packetized stream, based on a 188 byte long packet, is well suited for hardware error correction and processing schemes. Such a configuration can carry multiple programs within the same multiplex, even when the transmission environment is noisy. For example, MPEG-2 data can be transferred successfully over coaxial cable networks and satellite transponders with asynchronous multiplexing of constant or variable bit-rate programs to allow fast program access, channel hoping and synchronization between services.

As illustrated further in FIG. 1, MPEG-2 packetized stream consists of fixed length Transport Stream Packets (TSP or packets) based on 4 bytes of header followed by 184 bytes of TSP payload. TSP payload carries Packetized Elementary Stream (PES) data obtained by chopping up an Elementary Stream (ES), which consists of data of a common type and program. For example, audio for a specific program would form one elementary stream, while video for the same program would form a second elementary stream.

The TSP header consists of a synchronization byte (SyncByte), flags, information indicators for error detection and timing, an adaptation field indicator, and a Packet_ID (PID) field used to identify Elementary Streams carried in the payload. The adaptation field, when present, contains flags, and timing information.

The PID Field is used not only to distinguish separate Elementary Streams, but also separate Program Specific Information (PSI) tables. Prior art FIG. 2 illustrates two types of PSI tables—a Program Association Table 210 (PAT), and a Program Map Table 220 (PMT). The PAT table lists unique program numbers as identifiers for each program, or elementary stream, in a multiplex, and the PID number associated with each program number. A fixed PID number of 0x0000 is assigned to the PAT table, making it possible for the system to download the PAT table on startup by retrieving PID 0x0000 packets.

Each program identified by the PAT table has a related Program Map Table (PMT) having its own PID identifier. Each PMT table lists the PIDs for all Elementary Streams (components) making a given program associated with the PMT. A specific PMT table may be constructed for each program separately, or may be common for a group of programs. In the first case, there are many PMT tables with just one section, and each PMT table has a different PID value. In the second case one PMT table may have many sections, each relevant to one program.

In order to provide multiple services over the same multiplex, data associated with different multimedia services are transmitted, with packet multiplexing, such that data packets from several Elementary Streams of audio, video, data, and others are interleaved on a packet by packet basis into a single MPEG-2 packetized stream. Synchronization between Elementary Streams forming a common program is achieved using presentation time stamps and program clock references which can be transmitted as part of the adaptation field specified in the header.

Prior art FIG. 3 illustrates the fields associated with a PES stream. Each PES stream contains a header portion and a data portion. In addition, an optional header portion may exist. The header portion includes a Packet Start Prefix, a stream ID, and a packet length indicator.

Packetized stream information can be provided either through a direct broadcast, or through a service provider broadcast. Direct broadcast generally refers to signals which are received directly by an end user. Examples of direct broadcasts include satellite broadcasts received by satellite dishes and provided to a decoder at the end user's location, which receives and decodes the packetized stream data. Another type of direct broadcast is the traditional composite television/radio broadcast. In their most elementary forms, these broadcasts are not digital broadcasts. However, the transmission of digital broadcast in MPEG-2 format is being explored and occurring as an alternative. In this manner, the user would have a tuner capable of receiving the direct terrestrial link information containing the television or radio signals. Once demodulated, the packetized stream information could be provided to a desktop unit, or decoder, owned by the end user.

Service provider broadcast would include broadcast to the home provided by cable television providers, telephone company providers, or other independent providers. In this configuration, the service provider first receives the number of signals which can be ultimately provided to the end user. Examples of such received signals include satellite feeds, terrestrial feeds, switched video sources, local video sources such as tapes, or laser disk DVD's, as well as traditional table feeds. Based upon the end users demands, the received information can be selectively provided to the end user.

One problem associated with the flexibility of the MPEG-2 standard is that once the packetized stream is received, demodulated, and decrypted, the resulting data stream can still have variations which need be known before the data stream can be properly utilized. For example, the MPEG-2 specification does not indicate a specific set of control signals to be provided with the packetized stream, how received data and control signals are qualified, nor the precise format of the actual data transmitted. As a result, implementations of set top boxes require specific service provider information. Specific service provider information results in an incompatibility among packetized streams schemes provided by different service providers or cable operators. As a result, chip sets are designed and dedicated to support specific service provider's set top boxes.

Prior art FIG. 4 shows the fields associated with section packets. Section packets are used for transporting PSI tables (as shown in prior art FIG. 2) and system information (SI) tables. An eight-bit table ID (TID) field is used to identify the content associated with the section packet. For example, a TID of 0x00 identifies a program association section packet related to a PAT; while a TID of 0x01 relates to a conditional access section packet related to a conditional access table. A three-bit section length field provides information regarding the length of the section packet, allowing a host system to know the amount of memory needed to handle a particular section packet. Multiple sections may be used in representing a single table. Each section would carry a portion of the table data. An eight-bit section number field can be provided to indicate a specific portion of the table being represented by the section packet. For example, if 100 section packets are used to represent a PAT, a section number of 0x07 would indicate the seventh section packet of the set of 100 section packets. As shown in prior art FIG. 4, other fields are included in the section packet to identify the data represented in the section packet. A host system attempting to reproduce a specific PSI or SI table can identify specific section packets needed.

Prior art FIG. 5 illustrates a prior art system for parsing a packetized stream. The transport parser of the prior art would receive individual packets from the framer. Based upon the PID value, the transport parser would store the PSP data to be used by the system or the graphics engine in a local buffer. When the transport parser's local buffer was filled, the transport parser would cause a bus request to the appropriate controller (system or video) to initialize a transfer of at least some of the buffered data.

However, when the prior art host video or graphics system needed more data from the transport parser prior to the transport parser initializing the transfer, the system would initialize the transfer by generating a request to access data in the transport parser buffer. Since the bus used internally by the transport parser buffer may have other clients, the host system may have to wait to access the bus. The overall performance of the host system is reduced as a result of the system waiting on data.

Traditional methods for extraction include parsing of digital packets on the host CPU. For example, the host CPU parses program specific information and system information section packets included in the packetized stream packets. However, as the data rate increases, those methods become unsuitable in set-top box systems armed with relatively slow microprocessors or microcontrollers. Even high performance operating systems can have difficulty maintaining long time stable data reception during high bit-rate applications. When the host CPU is burdened with handling tasks for other applications, such as opening e-mail or performing file accessing, the system performance degrades further.

As the performance of the host system degrades, the host CPU becomes unable to process transport packets stored in memory buffers in the conventional system. The buffers become full and the conventional system is unable to accept new transport packets for storage. New transport packets must be discarded during high bit-rate transmissions and packets of data are lost. Therefore, a system and method of receiving packetized stream information that allows for more flexibility and improved performance in terms of data handling, data parsing, design implementation, and data stream acquisition would be advantageous.

BRIEF DESCRIPTION OF THE DRAWINGS

Specific embodiments of the present invention are shown and described in the drawings presented herein. Various objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, and wherein:

DETAILED DESCRIPTION OF THE FIGURES

One embodiment of the present invention provides a system for parsing section packet data. The system includes a data bus with a predetermined number of nodes for transmitting a plurality of data words and a clock node for transmitting an indication when a valid data word is being transmitted on the data bus. The system also includes a section parser. In one embodiment, the section parser includes a first storage location for storing a first value representing a valid data word having a first section field. The section parser also includes a second storage location for storing a second value representing a comparable section field. The section parser further includes a first section field for analyzing the first value with respect to the second value. In one embodiment, a host system stores a value describing a specific section packet or set of section packets it needs. The first filter then uses the value in the second storage location to allow only that packet or set of packets it needs.

Another embodiment of the present invention provides for a method of parsing section packet data. The method includes receiving transport packets and identifying a transport packet as being a section packet. The method includes comparing the value of a first field in the section packet to a value of a first field register to determine a first outcome. The method further includes determining whether to enable the section packet to be received by the host system or to discard the section packet. The determination is based on the first outcome. One advantage of the present invention is that processing overhead in a host system can be reduced by parsing section packets in hardware.

Figure 6:
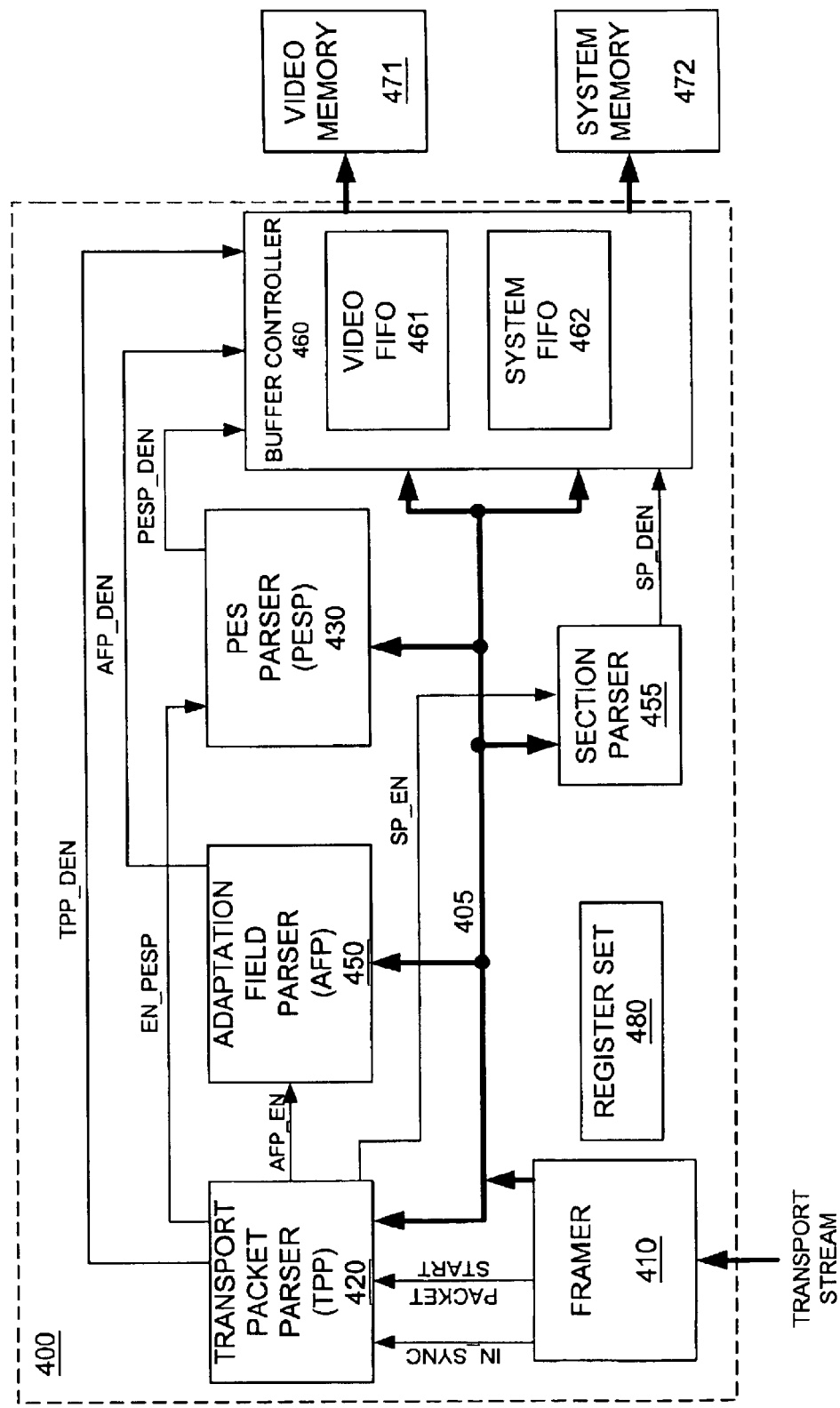
FIG. 6 is a block diagram illustrating a packetized stream core, according to one embodiment of the present invention.

The present invention is best understood with a reference to the specific embodiments illustrated herein. Specifically, FIG. 6 illustrates a packetized stream core 400 (PS core), Video Memory 471, and System Memory 472.

In operation, the PS core 400 receives packetized stream packets. Each packet is synchronized to the PS core 400, and demultiplexed. Each packet is demultiplexed based upon its Packet IDentifier (PID), which identifies the type of data carried in the packet. In one embodiment, the PS core 400 is bufferless in that no packet data is stored within the PS core 400 for access by video or system processing. Instead, the demultiplexed data is stored in one or more locations within each of the video memory 471, and the system memory 472. Packetized stream Core 400 includes a framer 410, Transport Packet Parser 420 (TPP), a PES Parser (PESP) 430, an Adaptation Field Parser (AFP) 450, a Section parser 455, a Buffer Controller 460, and register set 480.

In operation, the framer 410 receives a raw packetized stream which is analyzed to isolate and provide individual packetized stream packets (PSP) to the bus 405. In one embodiment, the bus 405 receives byte wide data (the data bus width could also be 16 or 32 bits) and a control signal to indicate when the current byte of data is valid. In addition, the framer 410 generates a signal labeled PACKET START to indicate the first byte of a packet, and a signal labeled IN_SYNC to indicate when the data on the bus 405 is synchronized, or locked onto by the framer 410.

The TPP 420 is connected to the bus 405, and receives the IN_SYNC and PACKET START signals. Parsing of a PSP (packet) by the TPP 420 is enabled when the IN_SYNC signal and the PACKET START signals are asserted indicating the beginning of a new packed. During parsing of the header portion of a packet, the PD number is obtained. Based upon the value of the PID number, registers are updated, and a determination is made whether the PSP is to be saved, further processed, or discarded.

When it is determined to save the packet, the TPP 420 asserts the signal labeled EN_TPP, which is received by the Buffer Controller 460. Based upon this enable signal, the Buffer controller 460 retrieves the packet data and stores it in a predefined memory location. When it is determined to discard the packet, no further action by the TPP 420 is needed, resulting in the remainder of the PSP being ignored.

When it is determined to further process the packet by one of the other parsers 455, 450 or 430, the TPP 420 asserts one of their respective enable signals. For example, if it is determined that the packet contains video data, the TPP 420 will assert the signal labeled PESP_EN, likewise, if it is determined that the packet contains adaptation field data, the TPP 420 will assert the signal labeled AFP_EN. If the packet is to be subjected to a series of filters based upon section data, the TPP 420 asserts the SP_EN signal. Based upon these signals being active, the respective parser will further process the packed data. For example, the AFP_EN signal activates AFP 450; the PESP_EN signal activates PESP 430; and, the SP_EN signal activates Section parser 455.

In response to being enabled by TPP 420, the Video PES Parser 430 further processes the packet by parsing the header of the video PES. Based upon information carried in the header of the video PES, registers are updated, and the video payload may be stored or discarded. When it is determined to save the video payload, PESP 420 asserts the signal labeled PESP_DEN, which is received by Buffer Controller 460. Based upon this enable signal, Buffer Controller 460 retrieves the packet data and stores it in a predefined location of video memory.

In one embodiment, if AFP_EN is active, AFP 450 processes the packet according to adaptation field data present in the packet. An adaptation field comparator (not shown) is used to match adaptation field data to a predetermined value. Based upon the comparison, AFP 450 can assert the signal labeled AFP_DEN. Based upon the signal, Buffer Controller 460 can retrieve the packet data and store it in memory, such as video memory 471, or system memory 472.

If SP_EN is asserted, Section parser 455 processes the packet according to section fields in the packet. The section packets are related to particular system information (SI) or program specific information (PSI) tables, such as a Program Association Table (PAT), Conditional Access Table (CAT), Network Information Table (NIT), or Program Map Table (PMT), as shown in the following table:

TABLE 1

Program Specific Information

| Structure Name | Stream Type | PID number | Description |
| --- | --- | --- | --- |
| Program Association Table | ITU-T Rec. H.222.0 \| ISO/IEC 13818-1 | 0x00 | Associates Program Number and Program Map Table PID |
| Program Map Table | ITU-T Rec. H.222.0 \| ISO/IEG 13818-1 | Assignment indicated in the PAT | Specifies PID values for components of one or more programs |
| Network Information Table | Private | Assignment indicated in the PAT | Physical network parameters such as FDM frequencies, Transponder Numbers, etc. |
| Conditional Access Table | ITU-T Rec. H.222.0 \| ISO/IEC 13818-1 | 0x01 | Associates one or more (private) EMM streams each with a unique PID value |

Figure 1:
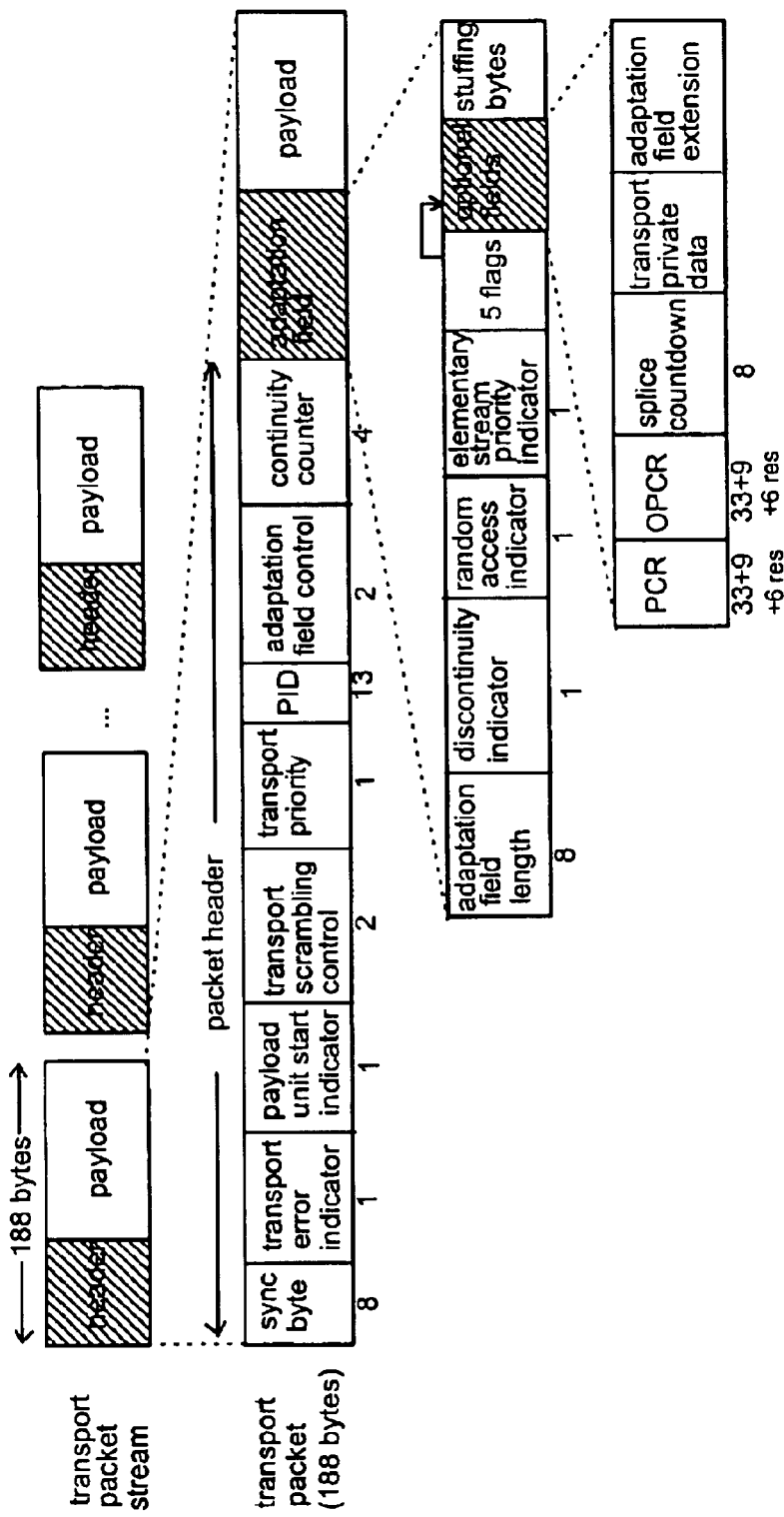
FIG. 1 is a block form illustrating prior art fields associated with a packetized stream packet.
Figure 2:
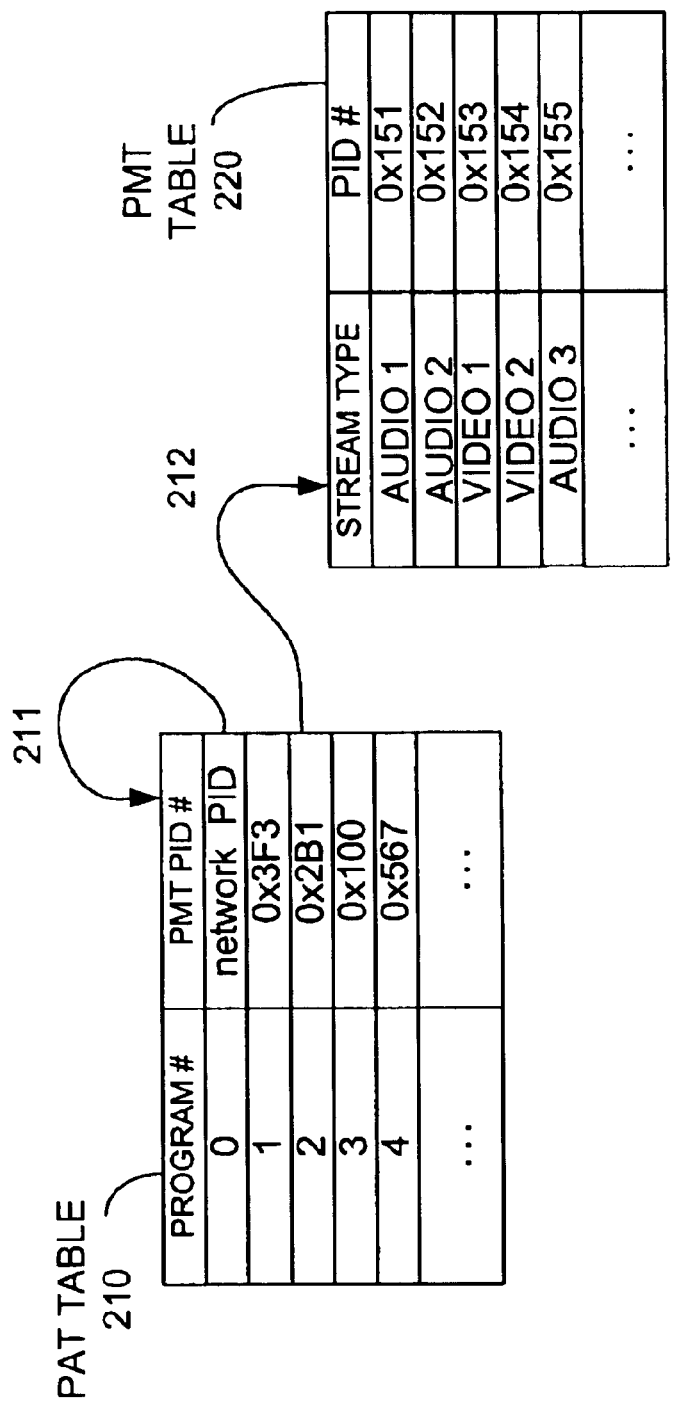
FIG. 2 is a table illustrating a prior art Program Specific Information tables.
Figure 3:
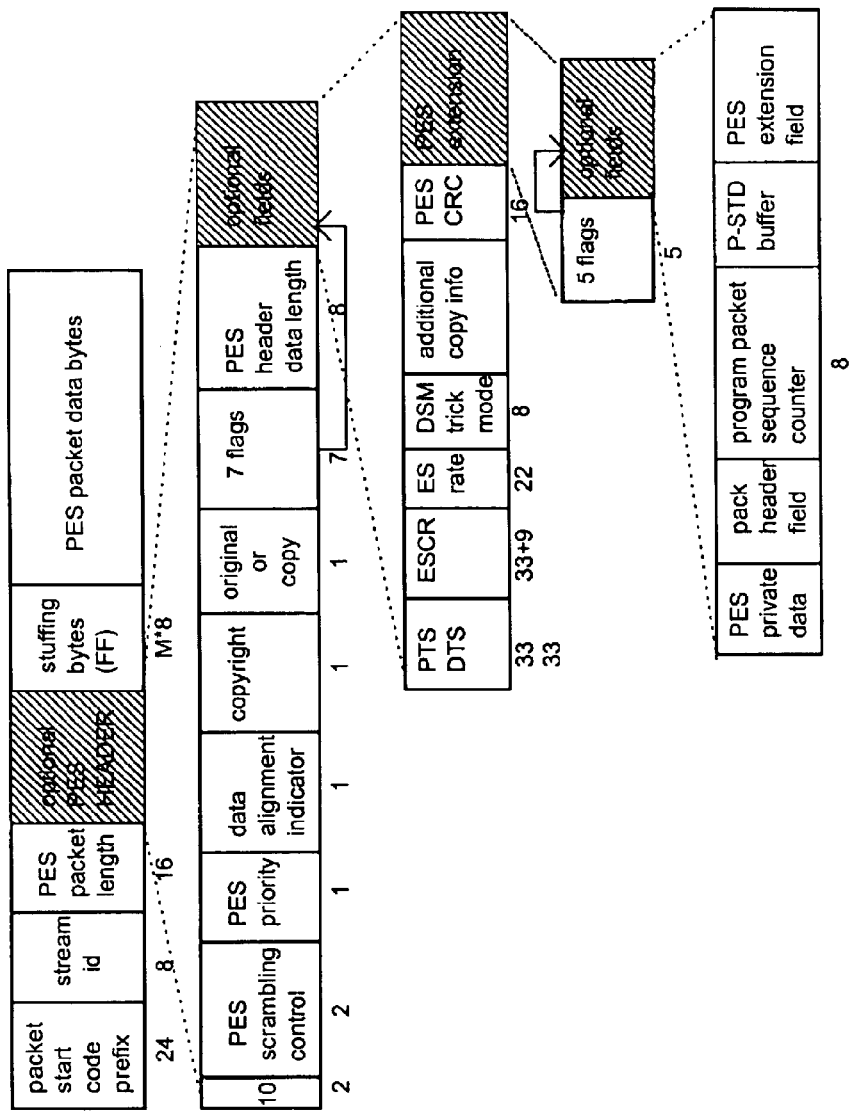
FIG. 3 is a block form illustrating prior art fields associated with Packetized Elementary Stream.
Figure 4:
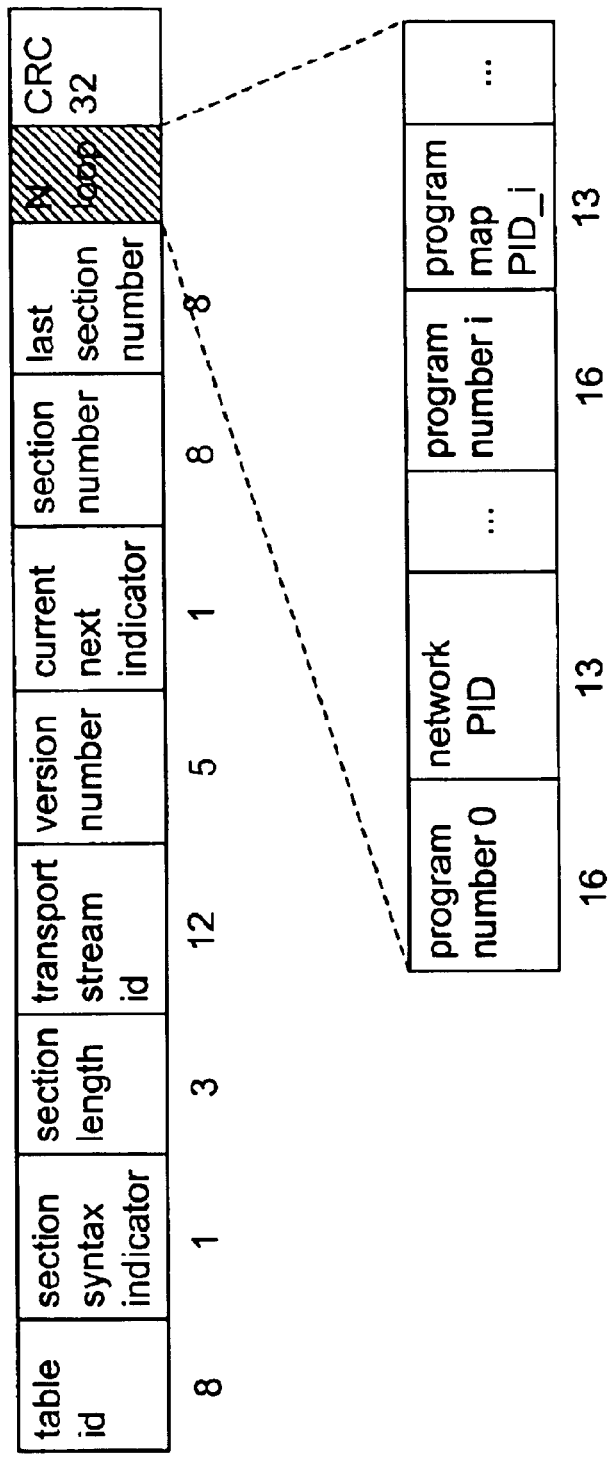
FIG. 4 is a block form illustrating prior art fields associated with Section Packets.

Table data is broken down into sections and each section is sent as a packet. A table can be represented using a single section. A table can also be represented over multiple sections. As shown in prior art FIG. 4, the sections include different fields identifying the nature of the section data. In one embodiment, the section fields include a table_id defining the PSI or SI table the section is associated with, a version_number indicating the version of the section data, and a section_length field providing the length of the data in the section.

Figure 9:
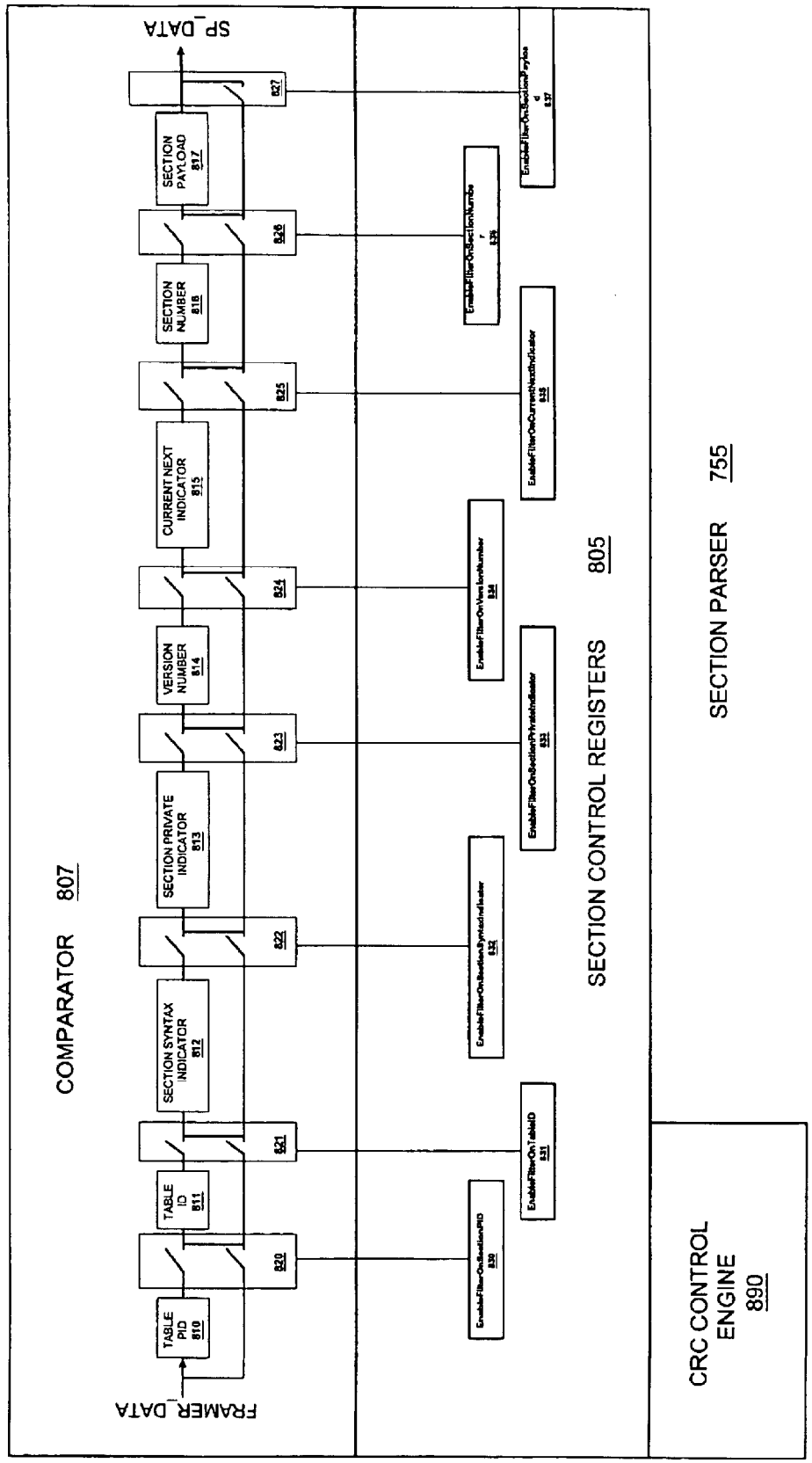
FIG. 9 is a block diagram illustrating a set of cascaded filters for parsing section data in a packetized stream packet, according to one embodiment of the present invention.

The packet is processed through a series of field filters (not shown), within Section parser 455, to compare specific fields to pre-determined values, as described further in FIG. 9. Dependent on whether or not the values of the fields in the packet match the pre-determined values, the packet is either parsed or discarded. If the values of the fields and the ore-determined values match, the SP_DEN signal is asserted and Buffer Controller 460 retrieves the parsed data and stores it accordingly. It will be appreciated that other SI tables may be represented, other than those described herein, such as a time and data table (TDT), a running status table (RST), a bouquet association table (BAT), a service description table (SDT), or an event information table (EIT). Other fields may also be present in the packet for describing various aspects of the tables.

Buffer Controller 460 receives and stores data payloads based upon control signals received from the parsers. Because the packet data is stored directly in the system memory 472, associated with a main system (not shown), or the video memory 471, associated with a video adapter (not shown), the packet data is not stored in PS core 400. Therefore, the core 400 and each of its parsers are described as bufferless. By storing data directly in the system memory 472 and the video memory 471, the system does not have to access memory space within the PS core 400. This eliminates delays associated with conventional systems that occurred when the system had to wait on PS core bus accesses to be completed before the needed data could be retrieved.

The bus connections between Buffer Controller 460 and system memory 472 can vary depending upon the implementation chosen. For example, both video memory 471 and system memory 472 can be connected to Buffer Controller 460 through a PCI (Peripheral Components Interconnect) bus, or system memory 472 can be connected to Buffer Control 460 through a PCI bus, while video memory 471 is connected to Buffer Controller 460 through an AGP (Accelerated Graphics Port).

Figure 7:
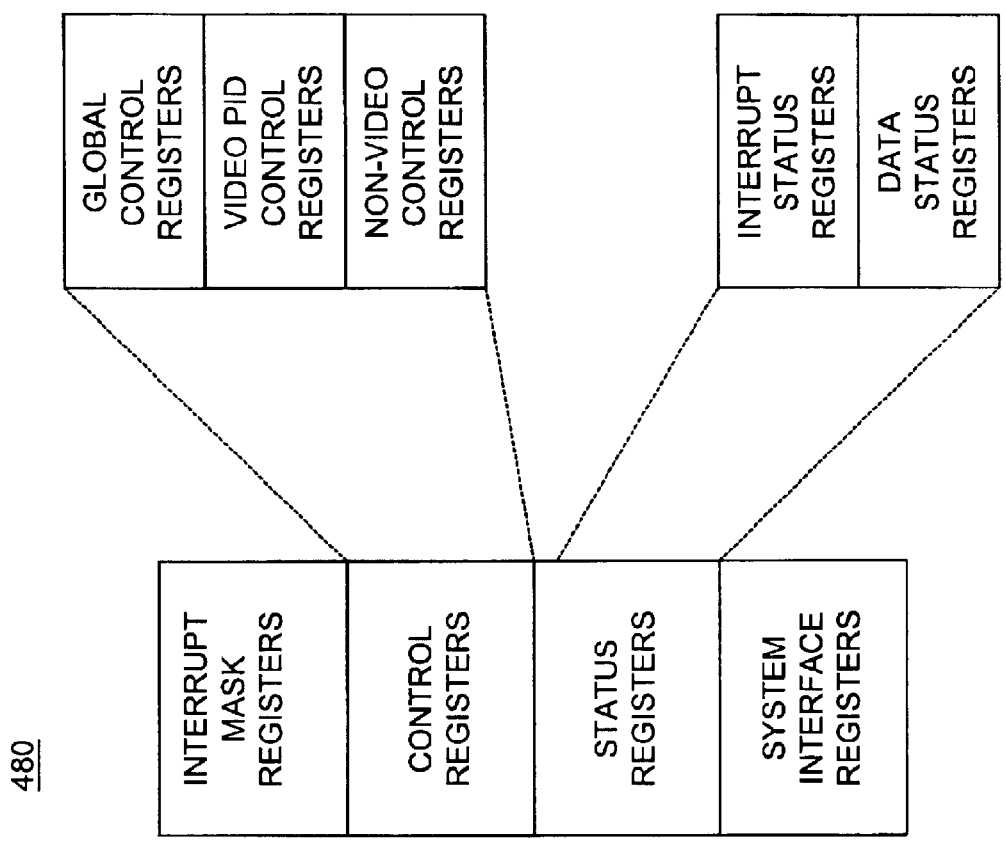
FIG. 7 is a table illustrating a register set, according to one embodiment of the present invention.
Figure 8:
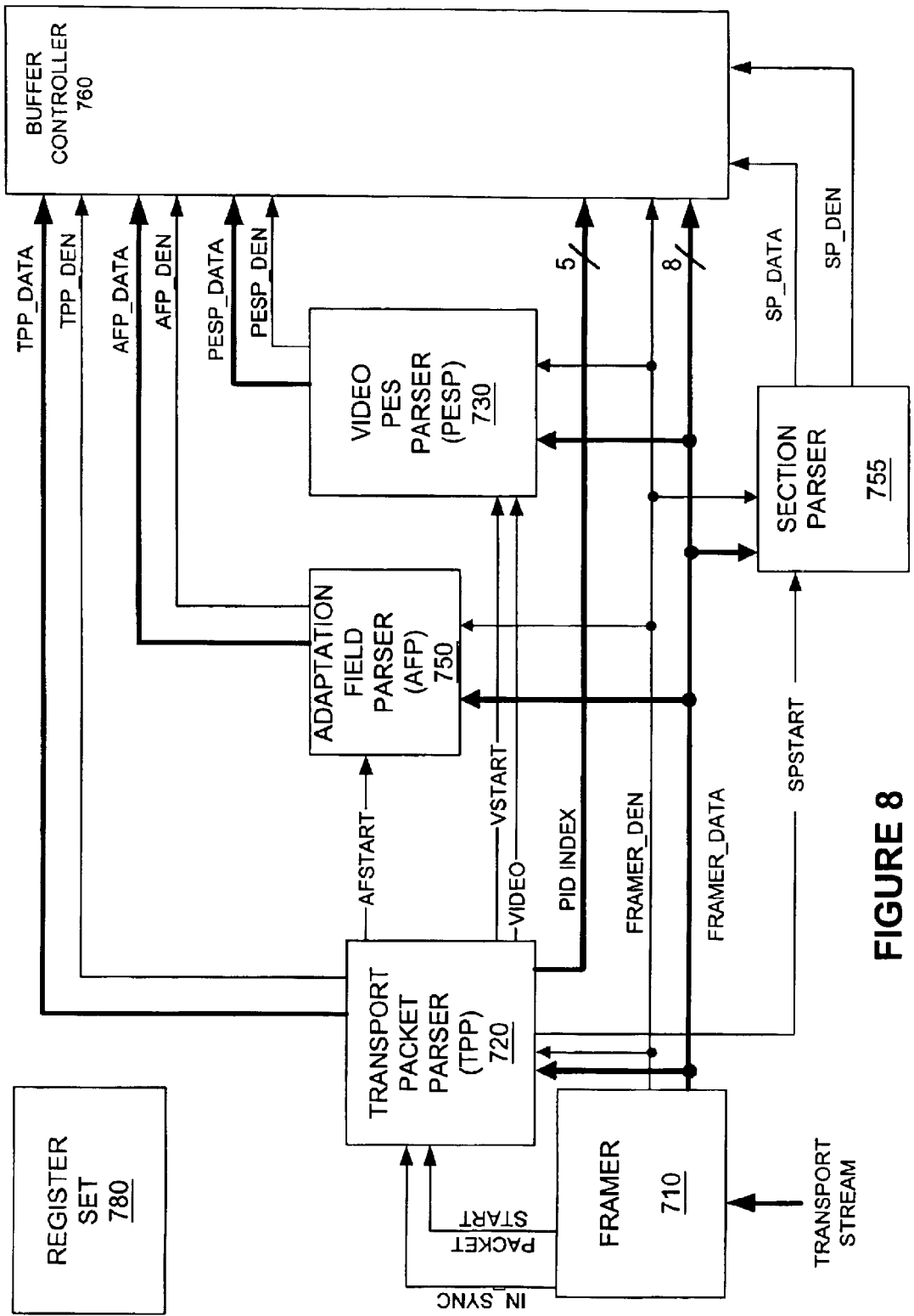
FIG. 8 is a block diagram illustrating a packetized stream core according to one embodiment of the present invention.

The register set 480 of FIG. 7 is further illustrated in FIG. 8. Generally, the register set 480 includes interrupt mask registers, control registers, status registers, and system interface registers. Interrupt mask registers are used to enable or disable specific interrupts. Control registers specify how various aspects of the PS core 400 are to operate. Further examples of types of control registers include Global Control Registers; Video Control Registers, which control how video packets are handled by the PS core; and Non-Video Control Registers, which control how non-video packets are handled by the PS core.

Referring now to FIG. 8, a block diagram illustrating another embodiment of a PS core is shown in accordance with the present invention. The PS core of FIG. 8 includes framer 710, TPP 720, Section Parser 755, AFP 750, PESP 730, Buffer Controller 760, and registers 780. The registers 780 are analogous to registers described with reference to FIG. 7.

The framer 710 provides packetized stream data labeled FRAMER_DATA on an eight-bit bus (or 16-bit or 32-bit) and provides a signal labeled FRAMER_DEN. FRAMER_ DATA is an eight-bit wide data byte, or word, which has been received from the packetized stream. The FRAMER_ DATA is qualified by the signal FRAMER_DEN, which is an enable signal. The signal FRAMER_DEN is asserted during each valid FRAMER_DATA.

The FRAMER_DATA and FRAMER_DEN signals are provided to each of the parsers of FIG. 8, the AFP 750, the PESP 730, and the Section Parser 755, and the Buffer Controller 760. The TPP parser 720 receives the header information of new packets when the framer 710 asserts an IN_SYNC signal and a PACKET_START signal. The combination of these signals, when asserted, indicate that the present FRAMER_DATA is part of the packet header. As a result, the TPP 720 receives the FRAMER_DATA from the data bus for parsing.

In a specific embodiment, the IN_SYNC signal provided by the framer 710 will be active whenever the framer 710 is locked onto, or synchronized with, the packetized stream. If the IN_SYNC signal is de-asserted, TPP 720 will not receive the data. Furthermore, the PACKET_START signal can be a single pulse asserted during the first byte of a new packet, or it can be a signal that is asserted during the first byte of the packet and not de-asserted until the last byte of the packet. The first byte of the packet can be defined in different manners. For example, the first byte can be defined to be the sync byte of a packet, or the first byte after the sync byte.

Based upon the PACKET_START signal, the TPP 720 can maintain a byte count indicating the location of a current byte within the packet being received. Based upon this count, the TPP 720 will parse the header of the packet, which is the first four bytes of the packet.

During the parsing of the packet header, TPP 720 receives the PID of the current packet. Based upon the PID value, TPP 720 can enable other parsers to perform additional parsing operations. For example, when the PESP 730 of FIG. 8 is a dedicated video PES parser, and the PID associated with a packet received by the TPP 720 is the video PID, the TPP will enable the PESP 730 by asserting the signal labeled VIDEO. Additionally, TPP 720 asserts the signal labeled VSTART when the current frame is the first frame of a PES stream. This indicates to the PESP that the elementary stream header is at least partially within the current frame. The VSTART signal allows the PESP to locate and parse the header of the video PES, while the VIDEO signal allows subsequent video payload to be retrieved. Likewise, when the adaptation field control of a packet header indicates that adaptation field data is to follow, the TPP 720 will provide a signal labeled AFSTART to indicate the beginning of the adaptation field. In response, the AFP 750 will parse the adaptation field of the current packet.

When a current packet is a section packet to be received by the PS Core of FIG. 8, the Section Parser 755 will receive the packet from FRAMER_DATA. The packet is then analyzed according to various fields present in the packet, as previously discussed, and provided to Buffer Controller 760. When the current packet is neither a section packet nor a video packet, the TPP 720 will receive the packet from FRAMER_DATA and provide the entire packet one byte at a time as TPP_DATA to the Buffer Controller 760. Similarly, when the packet is a video packet, the PESP 730 will receive video data payload from the FRAMER_DATA and provide it to the Buffer Controller 760, which is subsequently framing data bytes into double words as PESP_ DATA. Any data associated with the adaptation field of the packet will be provided to the Buffer Controller 760 from the AFP parser 750 as AFP data.

To parse packets for section fields, TPP 720 may assert the SPSTART signal. In one embodiment, Section Parser 755 includes a variety of registers to enable different section fields to filter on. If any of those fields are activated, the TPP 720 may have all section packets parsed by Section Parser 755. The SPSTART signal activates Section Parser 755. Section Parser 755 can then compare the fields presented in the packet in deciding whether to accept or discard the packet, sending the packet through SP_DATA and asserting SP_DEN to Buffer Controller 760 is the packet is accepted by Section Parser 755.

In response to the various data and control signals received from the parsers 720, 730, 750 and 755, the Buffer Controller 760 stores the data. In a specific mode, where all packets are to be stored, FRAMER_DATA and the control signal FRAMER_DEN can be received directly at the Buffer Controller 760 for storage.

In accordance with the present invention, each of the parser modules 720, 730, 750, and 755, and the framer 710, as well as any other module which may be included, are implemented to have modular layouts. For example, the layout of TPP 720 is modular when its layout is performed independent of the layout of any of the other module. As a result, TPP 720 will have a localized layout independent of the other modules. Independent development and reuse of modules is readily accomplished using modular layouts for modules having independent functions. This is an advantage over conventional systems, which did not differentiate the parsing functions using modular layouts, in that it provides greater flexibility and reuse in the design and implementation of packetized stream parsers.

Referring now to FIG. 9, a block diagram illustrating sets of functional components within a Section Parser is shown, according to one embodiment of the present invention. A comparator 807 is used to process and compare packets with specific section fields to determine whether to accept the packets or discard them.

The values of the section packet can be received from FRAMER_DATA. The values of the received section packet are latched into a register or set of registers (not shown) in Section Parser 755. In one embodiment, comparator 807 includes filters 810–817. Filters 810–817 are used to analyze section fields in the section packet. The fields define what data presented in the section packet specifically refers to. Each filter 810–817 handles a different field value to compare with the fields in the section packet. In one embodiment, field values are stored in registers, as described in Tables 3–5, within filters 810–817 for comparison to fields in the packet. For example, a table ID register, such as FilterTableID register in Table 3, can be used in the table ID filter 811. Packets, which pass through the enabled filters from filters 810–817, are passed to a host system through signal SP_DATA. SP_DATA may be provided to Buffer Controller 760 (FIG. 8).

In one embodiment, comparator 807 includes a table PID filter 810. Table PID filter 810 selects a specific packet identifier (PID) to filter on. When enabled, table PID filter 810 will pass only packets with a specific PID value stored in a register, such as EnableFilterOnSectionPID register described in Table 2. Packets with PIDs that do not match the specific PID value are discarded. In one embodiment, table PID filter 810 is enabled or disabled through table PID filter switch 820. Table PID filter switch 820 is used to either allow data to pass over filter table PID filter 810 or to be processed through table PID filter 810. Table PID filter switch 820 can be configured through values programmed to EnableFilterOnSectionPID register 830. In one embodiment, writing a section PID field value into EnableFilterOnSectionPID register 830 enables section PID filter 810. A null PID value, such as 4095, can be stored in EnableFilterOnSectionPID register 830 to disable section PID filter 810, through section PID filter switch 820.

In one embodiment, comparator 807 also includes table ID filter 811. All packets include a table ID field. The table ID field is an 8-bit field specifying which of the PSI or SI tables with which the section data is related to. Accordingly, the table ID filter 820 can choose to filter sections containing data from only one specific table, using a specific table ID value stored in a register, such as FilterTableID register in Table 3. An EnableFilterOnTableID register 831, as described in Table 2, can be used to enable/disable table ID filter 811, through table ID filter switch 821.

In one embodiment, comparator 807 includes section syntax indicator filter 812. Data carried on the packetized stream may be provided using different syntax types. The section syntax indicator filter 812 is used to identify section packets with a specified syntax indicator field value. The syntax field of the received section packet is compared to a specified value in a syntax indicator field register, such as FilterSectionSyntaxIndicator register described in Table 4. A host system (not shown) can be provided with packets including only a specified syntax. The host system can use the filtered section packets to determine the appropriate syntax to use and configure a system application accordingly, allowing the system to accommodate for the syntax or semantics of the packetized stream data provided. A value written to an EnableFilterOnSectionSyntaxIndicator register 832, as described in Table 2, can be used to enable/disable section syntax indicator filter 812, through section syntax indicator filter switch 822.

In one embodiment, comparator 807 includes a section private indicator filter 813. Section packets may include an active private indicator field. The private indicator field provides information about the format of the data being represented in the section packet. For example, MPEG streams use a value of 1 for the private indicator field. The section private indicator filter 813 can be used to selectively pass section packets from specific types of packetized streams. Section private indicator filter 813 compares the value of the private indicator field in the section packet with a value stored in a register, such as FilterSectionPrivateIndicator register described in Table 4. A value written to an EnableFilterOnSectionPrivateIndicator register 833, as described in Table 2, can be used to enable/disable section private indicator filter 813, through section private indicator filter switch 823.

In one embodiment, comparator 807 includes a version number filter 814. A version number field is included in all packetized stream packets. As tables are updated, different versions of the same table may be present within the packetized stream packet. To complete all the section data associated with a single table, the table data is taken from sections bearing the same version. Accordingly, section packets include the version number field to indicate which version is being presented in the packet. To allow Section Parser 755 to selectively parse only section packets with a particular version number, the version number filter 814 is used. Version number filter 814 may compare the value of the version number field of the received section packet to a value of a version number stored in a register, such as FilterSectionVersionNumber register in Table 4, to accept only section packets with a selected version number. A value written to an EnableFilterOnVersion number register 834, as described in Table 2, can be used to enable/disable section version number filter 814, through version number filter switch 824.

In one embodiment, the comparator 807 includes a current next indicator filter 815. Section packets always include a current/next field. The current/next field indicates whether the data provided in the section packet is applicable to the status of the current set of section data or to the next set of section data. If the current/next field indicates the section information related to the current set of data, a host system, through Buffer Controller 760 (FIG. 8), can gather the status of the current section packet to know how to properly handle the current set of data. Alternatively, the current/next field may indicate a section packet relates to the next set of data on the packetized stream. Accordingly, the host system may need to know the table information of the next set of data to properly accommodate to a program change or a network upgrade or maintenance. Current next indicator filter 815 can be used to pass data related specifically to the current packet or related to future packets, allowing the host system to configure itself appropriately. The current next indicator filter 815 can compare a value of the current/next field to a value of a current/next register, such as FilterSectionCurrentNextIndicator register described in Table 4. A value written to an EnableFilterOnCurrentNextIndicator register 835, as described in Table 2, can be used to enable or disable current next indicator filter 815, through current next indicator filter switch 825.

In one embodiment, the comparator 807 includes a section number filter 816. As previously discussed, PSI and SI table data is represented using the section packets. In one embodiment, the sizes of the section packets are limited. For example, the maximum size of the section packets, as defined by the MPEG-2 standard (ISO 13818-1), is 1024 bytes or 4096 bytes, depending on a section syntax indicator. If the table data exceeds the maximum, the table data must be sent over multiple section packets. The section packets include a section number field indicating which portion of the entire table data the section packet represents. In one embodiment, the host system specifies a section number that is needed to complete the table from the data by storing the value of the section number in a section number register, such an FilterSectionNumber register described in Table 3. The section number filter 816 compares the value of the section number field in the section packet to the specified section number stored in the section number register to determine whether to pass the section packet to the host system or to discard the section packet. A value written to an EnableFilterOnSectionPrivateIndicator register 836, as described in Table 2, can be used to enable/disable section syntax indicator filter 816, through section number filter switch 826.

In one embodiment, the comparator 807 includes a section payload filter 817. The payload of the section packet includes the actual table data being carried by the section packet in one embodiment, section payload filter 817 compares 8 bytes of the section payload to values stored in a set of payload registers. A FilterSectionPayloadHi register, as described in Table 5, may be used to compare the first 4 bytes of the payload to a specified value. A FilterSectionPayloadLow register, as described in Table 5, may be used to compare the last 4 bytes of the payload to a specified value. If the values of the specified payload registers and the values of the associated payload portions in the section packet are equivalent, the section packet is passed to the host system, through Buffet Controller 760 (FIG. 8). A value written to an EnableFilterOnSectionPayload register 837, as described in Table 2, can be used to enable/disable section payload filter 817, through section payload filter switch 827.

In one embodiment, Section Parser 755 also includes a cyclic redundancy check (CRC) engine 890. In one embodiment, a 32-bit CRC field is included at the end of the section packet. CRC is generally used to detect error corruption. CRC engine 890 calculates the CRC of the section packet, as data is received and compares the CRC value in the packet to the calculated CRC to determine if the section packet is damaged or incomplete. If the values match and CRC engine 890 is enabled, the section packet is passed to the host system through SP_DATA. In another embodiment, a register in CRC engine 890 is used to store a value of a previously passed section packet with the same version number. As previously discussed, different versions of the table data being passed by the section packets. In some cases, a new version of the table is generated but the version number has not changed. To confirm that the version has not changed, the stored CRC in the register is compared to the CRC of a new section packet with the same section and version numbers as the passed section packet. If the CRCs do not match, the host system is notified of the version change through a signal such as SP_DATA. In one embodiment, CRC engine 890 is enabled/disabled/through values stored to an EnableCRC32Engine register, as described in Table 2.

As previously discussed, section control registers 805 includes various registers for controlling the operations of Section Parser, as shown in Table 2. For example, section control registers 805 can be used for configuring and enabling individual filters 810–817 and CRC engine 890.

TABLE 2

Section Parser Control Registers

Demultiplexer Section PID Control Registers (TD_SPIDCR_0 . . . TD_SPIDCR_31)

| Field Name | Bits | Len | Default | Type | Description |
|---|---|---|---|---|---|
| EnableFilterOnSectionPID | 0–12 | [13] | 4095 | R/W | Selects a specific PID of the component stream to filter on. Value of 4095 is reserved one (it means NULL transport packets). |
| EnableFilterOnTableID | 13 | [1] | 0 | R/W | If 1, filter on table_id is on, otherwise this filter is off |
| EnableFilterOnSectionSyntaxIndicator | 14 | [1] | 0 | R/W | If 1, filter on section_syntax indicator is on. |
| EnableFilterOnSectionPrivateIndicator | 15 | [1] | 0 | R/W | If 1, filter on section_private indicator is on. |
| EnableFilterOnCurrentNextIndicator | 16 | [1] | 0 | R/W | If 1, filter on section_current_next_indicator is on |
| EnableFilterOnSectionExtension | 17 | [1] | 0 | R/W | If 1, filter on section extension is on. |
| EnableFilterOnVersionNumber | 18 | [1] | 0 | R/W | If 1, filter on version number is on. |
| EnableFilterIfNotThisVersion | 19 | [1] | 0 | R/W | If 1, filter on version_number filter picks up any version different that one defined |

TABLE 2-continued

Section Parser Control Registers

Demultiplexer Section PID Control Registers (TD_SPIDCR_0 ... TD_SPIDCR_31)

| Field Name | Bits | Len | Default | Type | Description |
|---|---|---|---|---|---|
| EnableFilterOnAnySectionAndStop | 20 | [1] | 0 | R/W | If 0, version_number filter looks for exact match. If 1, specified section filter grabs start of any section and stores 8 bytes of table header in the status register. |
| EnableFilterOnSectionPayload | 21 | [1] | 0 | R/W | If 1, filter on section payload is enabled. |
| EnableFilterOnSectionNumber | 22 | [1] | 0 | R/W | If 1, filter on section payload is enabled. |
| EnableCRC32Engine | 23 | [1] | 0 | R/W | If 1, hardware CRC32 engine check is on, all sections with CRC32 error are discarded. If 0, no CRC32 check is done. |
| ExtendSectionPrivateIndicator | 24 | [1] | 0 | R/W | If 1, private_indicator is considered as 3 bits. If 0, private_indicator is a single bit value ... |
| DefineSectionRingIndex | 25–30 | [6] | 0 | R/W | Defines ring buffer index (1..63) where table is routed. |
| EnableFiltering | 31 | [1] | 0 | R/W | If 1, parsing from the next transport packet is enabled. |

As previously discussed, each of the filters 810–817 can be enabled and applied serially to the section packet. For example, by setting the EnableFilterOnTableID register 830 to a logical value of '1', the table ID filter 811 is enabled, allowing the table ID field to be parsed by SectionParser 755. Enabled filters of filters 810–817 can each be applied for comparison against field values in the section packet being parsed by Section Parser 755. Accordingly, received section packets would have to pass all the enabled filters to be successfully parsed through Section Parser 755 and be sent to Buffer Controller 760 (FIG. 8), through SP_DATA. It should be appreciated that other control registers may be included, not listed in Table 2, without departing from the scope of the present invention.

In one embodiment, Section Parser 755 can be configured for parsing multiple table configurations. Multiple sets of the registers described in Tables 2–5 are used to handle the different table configurations. For example, in one embodiment, up to 32 tables, or section packet types, can be parsed using Section Parser 755. Accordingly, 32 sets of the registers described by tables 2–5 are used to store the configurations for parsing each of the section packets for the 32 tables. In one embodiment, once a specific packet was parsed, the control registers regarding that section packet would be set to disable further parsing of that section packet type. For example, once a section packet with a particular section PID was parsed by Section Parser 755, control registers 805 would disable filters 810–817 to ensure that the same table was not parsed again, unless requested.

As previously discussed, registers are used for storing field values to be used by filters 810–817. Filters 810–817 use the registers for comparison to the fields included in the section packets being parsed, as shown in Tables 3–5.

TABLE 3

Section ID Filter Registers

Demultiplexer Section ID Filter Registers
(TD_SIDFR_0 ... TD_1 SIDFR_31)           index = (x * 8) + 3

| Field Name | Bits | Len | Default | Type | Description |
|---|---|---|---|---|---|
| FilterTableID | 00–07 | [8] | 0xFF | R/W | Defines a table_id field value to filter on. Value 0xFF disables PSISIF filtering engine. |
| FilterTableIDExtension | 08–23 | [16] | 0x0000 | R/W | Defines a table extension field value to filter on. |
| FilterSectionNumber | 24–31 | [8] | 0x00 | R/W | Defines a section_number to filter on. |

Table 3 lists specific registers used for storing field values dealing with section packet identifiers. A host system needing a specific section packet dealing with a specific identification can write the identifiers of the packet into the registers. For example, a specific table ID can be written to FilterTableID register.

The table ID filter 811 can then use the value to parse a section packet with the specific table ID.

TABLE 4

Section Bit Filter Registers

Demultiplexer Section ID Filter Registers (TD_SBFR_0 . . . TD_SBFR_31)

| Field Name | Bits | Len | Default | Type | Description |
|---|---|---|---|---|---|
| FilterSectionSyntaxIndicator | 0 | [1] | 0 | R/W | 1 or 0 specifies section_syntax_indicator value to filter on. |
| FilterSectionPrivateindicator | 1–3 | [3] | 0 | R/W | 7 or 3 specifies section_private_indicator value to filter on. |
| FilterSectionCurrentNextIndicator | 04 | [1] | 0 | R/W | 1 or 0 specifies section_current_next_ind value to filter on. |
| FilterSectionVersionNumber | 05–09 | [5] | 0 | R/W | 0 to 31 specifies section_version_number value to filter on. |
| UnusedBitfield | 10–31 | [22] | 0 | R/W | Unused bit field. Always set to 0. |

Table 4 describes registers used for storing values of specific bit fields for parsing received section packets. For example, version number filter 814 can compare a value stored in FilterSectionVersionNumber to the version number field included in the section packet received from FRAMER_DATA.

TABLE 5

Section Payload Filter Registers

Demultiplexer Section Payload Filter Registers

| Field Name | Bits | Len | Default | Type | Description |
|---|---|---|---|---|---|
| FilterSectionPayloadHi | 00–31 | [32] | 0 | R/W | Specifies first 4 bytes of the section payload (MAC address) |
| FilterSectionPayloadLow | 32–33 | [32] | 0 | R/W | Specifies second 4 bytes of the section payload (CA info) |

Table 4 described registers used for storing values to compare against the payload of received section packets. In one embodiment, FilterSectionPayloadHi register is used for comparison against the first 4 bytes of the section packet payload. This could be used by a host machine, through Buffer Controller 760 (FIG. 8) to process a Media Access Control (MAC) address dealing with the section packet. A MAC address is a hardware address generally used to uniquely identify each node of a network. FilterSectionPayloadLow register is used to compare against the last 4 bytes of the section packet payload. This could be used to locate CA information dealing with the section packet. It should be noted that registers other than the ones listed in Tables 3–5 can be included without departing from the scope of the present invention.

Figure 10:
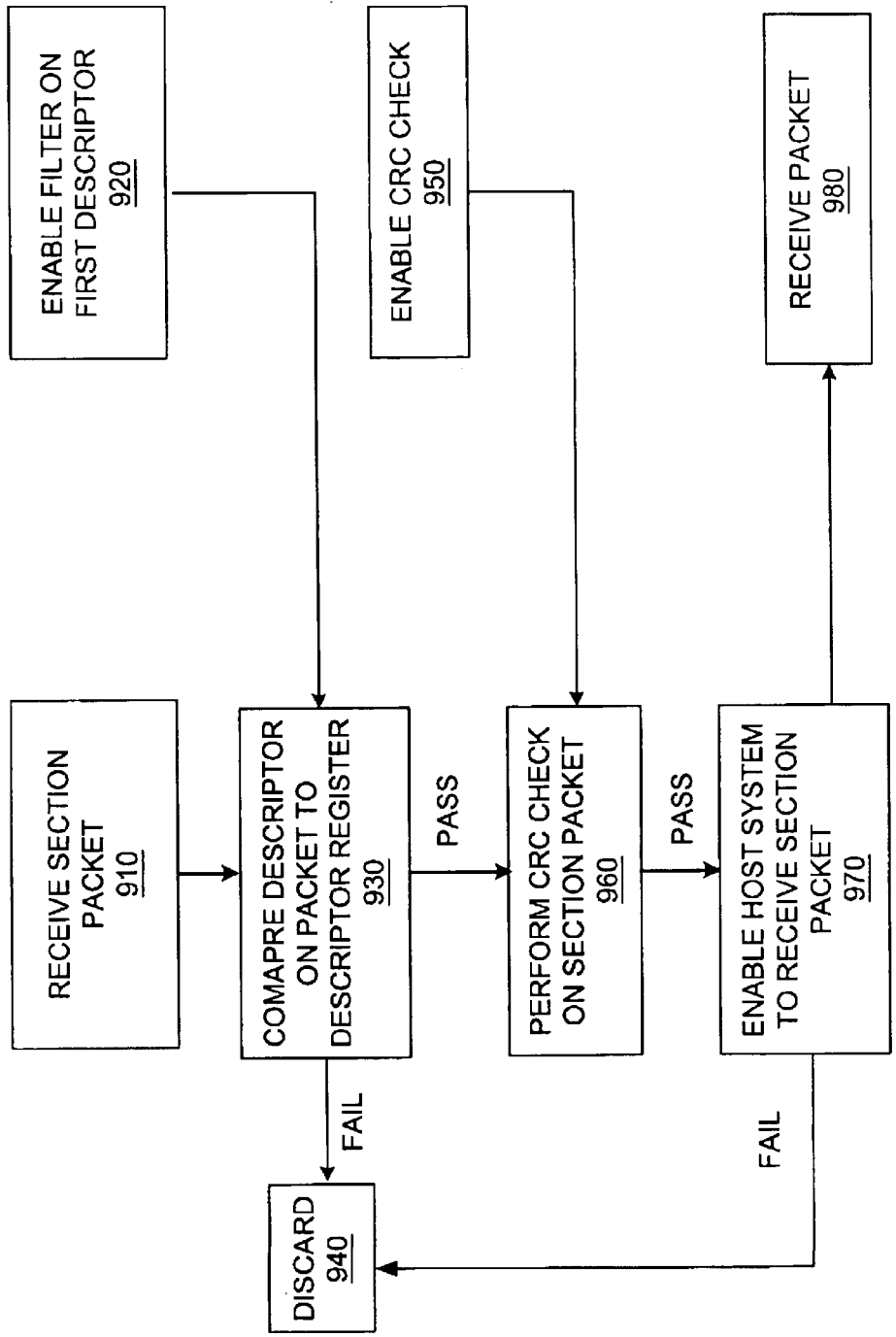
FIG. 10 is a flow diagram illustrating a method of parsing packetized stream packets containing section data, according to one embodiment of the present invention.

Referring now to FIG. 10, a flow diagram illustrating a method for parsing section packets in hardware is shown, according to one embodiment of the present invention. Table data is broken into different section packets. The section packets are sent as part of a multimedia packetized stream. Hardware, such as Section Parser 755 (FIG. 9) is used to parse the section packets before sending them to a host system.

Figure 5:
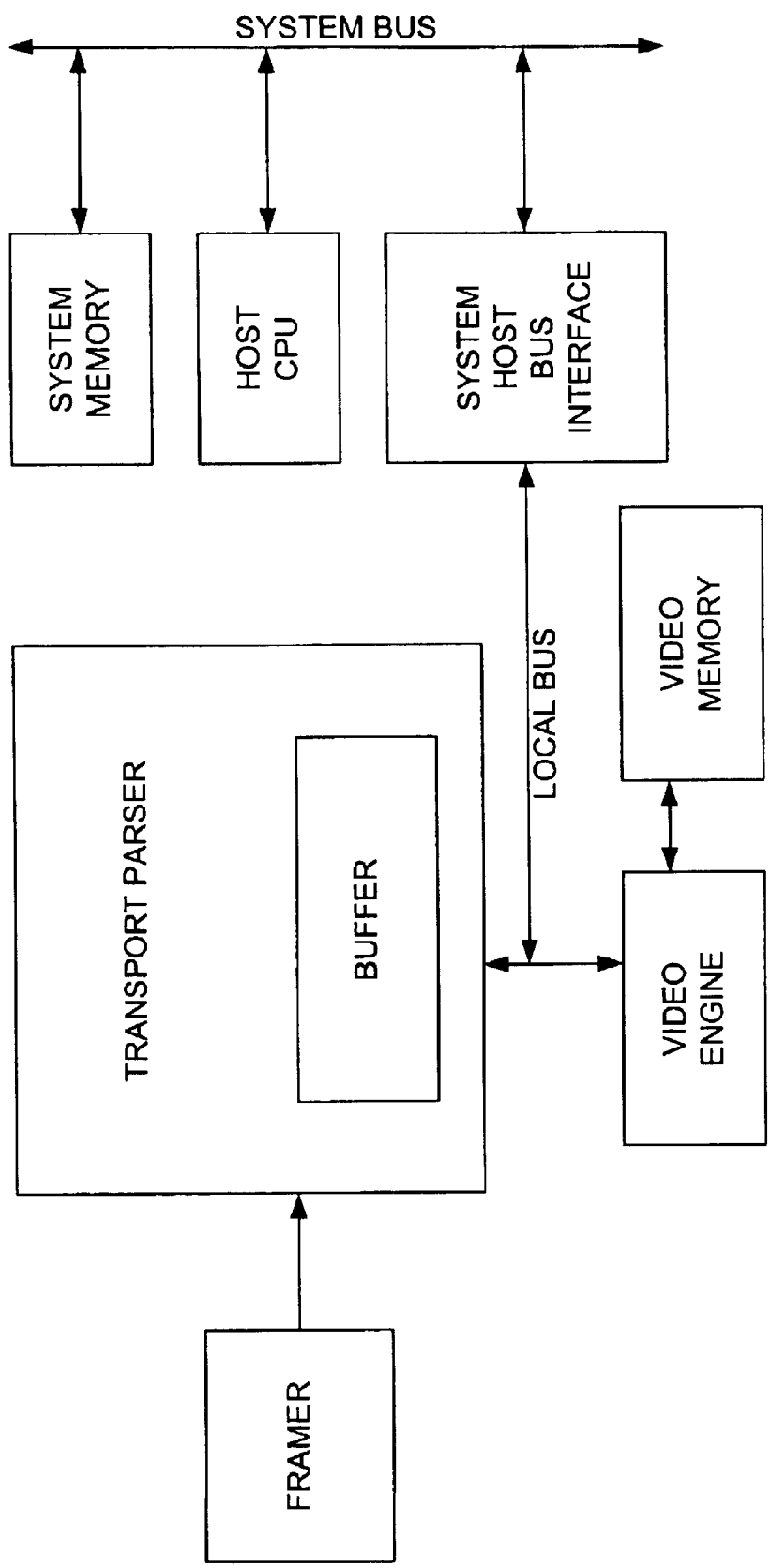
FIG. 5 is a block diagram illustrating a prior art representation of a parser system.

In step 910, a Section Parser receives the section packet. In one embodiment, the section packet is received from a packetized stream by a framer and a transport packet parser before being released to the Section Parser, as described in FIG. 5. A host system coupled to a Section Parser can apply values in register sets within the Section Parser, as described in Tables 2–5. The Section Parser uses the settings within the register sets to select various control options for parsing received section packets. For example, the host system can specify section packet fields needed to complete a specific data table. The Section Parser can then parse the section packets to deliver only the section packets needed by the host system to complete the data table. In one embodiment, the host system can also set register values to disable or enable the operation of the Section Parser.

In step 920, the host system enables one of the field filters on the Section Parser. In one embodiment, there are several fields which may be chosen to filter on. Each of the filters may be independently enabled, allowing specific fields in the section packet to be analyzed. For the purpose of this discussion, the host system has enabled the table ID filter. In one embodiment, the table ID filter is selected by asserting the 13$^{th}$ bit within the Section Parser's control registers, as described in Table 2. The table ID field provides the identity of the type of table the section packet represents. In one embodiment, the host system programs a table ID register, such as FilterTableID register as described in Table 3, providing the table ID of a table the host system desires.

In step 930, the Section Parser compares a value of a field within the section packet with a value of a field register. With the table ID filter, such as table ID filter 811 of FIG. 9, enabled, the Section Parser compares the table ID field included with the section packet to the table ID register, such as FilterTableID register described in Table 3. In step 940, if the field in the packet and the register are not equivalent, the Section Parser fails the section packet and discards it. In one embodiment, discarding the packet includes allowing the packet to be left on the bus without telling the host system to read it. Accordingly, to discard a packet, no further processing is required by the Section Parser. If the packet field value is equivalent to the value in the field register, the Section Parser passes the packet to the nest enabled filter or component of the Section Parser.

It should be noted that other field types are present in the section packet. For example, section packets may include a section number field, a version number field, a current/next indicator field, or a private indicator field. Accordingly, various field filters may be employed to parse the section packets with all or some of the fields, as described for filters 810–817 in FIG. 9. Multiple fields may be included to allow a host system to specify specific section packets desired. As previously discussed, each of the field filters may be independently enabled or disabled through control registers within the Section Parser, as described in Table 2. In one embodiment, the Section Parser may be configured to parse multiple section packets. Accordingly, separate sets of registers for each of the section packet types to be parsed may be included. For example, separate register sets may be included for each of the types of data tables supported by the host system. The individual register sets may be configured for supporting the section packets needed to complete each data table.

In step 950, the host system enables a CRC check component, such as CRC engine 890 (FIG. 8), in the Section Parser. In step 960, the host system analyses the CRC included in the section packet. As previously discussed, a CRC is generally used to determine if the provided packet is complete and uncorrupted. A packet subjected to a transmission error may become corrupted. By internally calculating the CRC in the Section Parser, the calculated CRC can be compared to the CRC provided in the section packet. In one embodiment, if the section packet CRC is different from the calculated CRC, the section packet is failed and discarded, as described for step 940. If the CRC values are equivalent, the section packet is passed to the next component of the Section Parser. As previously discussed, the CRC can also be compared to determine if the section packet is related to an alternate version of the data table represented by the section packet. In step 970, the Section Parser instructs the host system to read the passed section packet. In one embodiment, the Section Parser asserts a SP_DEN signal, as illustrated in FIG. 8. In step 980, the host system reads the passed section packet. In one embodiment, the host system reads the section packet directly from the Section Parser. In another embodiment, the host system reads the section packet from a system bus, after the instruction from the Section Parser form step 970. In one embodiment, once the Section Parser has parsed the desired section packet, the Section Parser disables any further parsing of the section packets.

It should now be appreciated that the Section Parser described herein allows processing overhead generally left to a host system to be performed through hardware. Therefore, it should now be apparent, that a system for parsing section packet data as describe herein would be advantageous over the prior art. In the preceding detailed description of the preferred embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A system for parsing section data associated with a transport packet of a packetized elementary stream, the system comprising:

a data bus having a predetermined number of nodes for transmitting a plurality of data words;

a clock node to transmit an indication when a valid data word is being transmitted on the data bus;

a section parser including:

a first storage location having an output, the first storage location to store a first value representing a valid data word having a first section field, wherein the first section field includes at least one of a table ID, a section syntax indicator, a version number, a current/next indicator, a section number, and a section payload;

a second storage location for storing a second value representing a comparable section field; and a first section field filter for analyzing the first value with respect to the second value.

2. The system as in claim 1, wherein the output of the first storage location in the section parser is coupled to a host system for further processing of the first value.

3. The system as in claim 1, wherein the section parser is operable to be enabled in a first mode of operation and disabled in a second mode of operation.

4. The system as in claim 1, wherein the section parser includes a second section field filter coupled to the first section field filter.

5. The system as in claim 4, wherein the section parser includes control registers capable of being set to enable the first and the second filters independent of each other.

6. The system as in claim 1, wherein the section fields relate to packetized stream table data.

7. The system as in claim 6, wherein the packetized stream table data relates to Program Specific Information (PST) Tables including at least one of one of a Program Association Table (PAT), a Program Map Table (PMT), a Network Information Table (NIT), and a Conditional Access Table (CAT).

8. The system as in claim 6, wherein the packetized stream table relates to a System Information (SI) Tables.

9. The system as in claim 1, further including:

a transport packet parser comprising a first TPP output to enable the section parser when a value on the data bus indicates the section parser is to be enabled.

10. The system as in claim 9, wherein the section parser has a modular layout, wherein the layout of the transport packet parser and the section parser are mutually exclusive.

11. The system as in claim 9, wherein the system further includes:

an adaptation field parser comprising an enable input to receive a signal from the transport packet parser, the enable input to enable the adaptation field parser when another value on the data bus indicates the adaptation field parser is to be enabled.

12. The system as in claim 9, wherein the section parser has a modular layout, wherein the layout of the transport packet parser and the section parser are modular with respect to each other.

13. The system of claim 1, wherein the first section field indicator is the table ID.

14. The system of claim 1, wherein the first section field indicator is the section syntax indicator.

15. The system of claim 1, wherein the first section field indicator is the version number.

16. The system of claim 1, wherein the first section field indicator is the current/next indicator.

17. The system of claim 1, wherein the first section field indicator is the section number.

18. The system of claim 1, wherein the first section field indicator is the section payload.

19. A method comprising:

receiving transport packets;

identifying a transport packet as being a section packet;

comparing a value of a first field in the section packet to a value of a first field register to determine a first outcome, wherein the first field includes at least one of a table ID, a section syntax indicator, a version number, a current/next indicator, a section number, and a section payload; and determining whether to enable the section packet to be received by a host system or to discard the section packet, based upon the first outcome.

20. The method as in claim 19, wherein the section packet relates to Program Specific Information (PSI) tables.

21. The method as in claim 19, wherein the section packet relates to System Information (SI) tables.

22. The method as in claim 19, wherein comparing the value of the first field to the value of the first field register includes determining if the values are equivalent.

23. The method as in claim 19, further including:

comparing the value of a second field in the section packet to a value of a second field register to determine a second outcome; and determining whether to enable the section packet to be received by a host system or to discard the section packet, based upon the first and the second outcomes.

24. The method of claim 19, wherein the first section field indicator is the table ID.

25. The method of claim 19, wherein the first section field indicator is the section syntax indicator.

26. The method of claim 19, wherein the first section field indicator is the version number.

27. The method of claim 19, wherein the first section field indicator is the current/next indicator.

28. The method of claim 19, wherein the first section field indicator is the section number.

29. The method of claim 19, wherein the first section field indicator is the section payload.

* * * * *